United States Patent
Karlsberger et al.

(10) Patent No.: US 9,689,432 B2
(45) Date of Patent: Jun. 27, 2017

(54) BEARING ARRANGEMENT

(71) Applicant: Miba Sinter Austria GmbH, Laakirchen (AT)

(72) Inventors: Martin Karlsberger, Eberstalzell (AT); Karl Dickinger, Vorchdorf (AT)

(73) Assignee: Miba Sinter Austria GmbH, Laakirchen (AT)

( * ) Notice: Subject to any disclaimer, the term of this patent is extended or adjusted under 35 U.S.C. 154(b) by 0 days.

(21) Appl. No.: 15/089,793

(22) Filed: Apr. 4, 2016

(65) Prior Publication Data
US 2016/0319874 A1     Nov. 3, 2016

(30) Foreign Application Priority Data

Apr. 28, 2015   (AT) .............................. A 50342/2015

(51) Int. Cl.
| | |
|---|---|
| *F16C 35/02* | (2006.01) |
| *F16C 17/02* | (2006.01) |
| *F16C 9/02* | (2006.01) |
| *F16C 9/04* | (2006.01) |

(52) U.S. Cl.
CPC ............... *F16C 35/02* (2013.01); *F16C 9/02* (2013.01); *F16C 9/04* (2013.01); *F16C 17/022* (2013.01); *F16C 2226/60* (2013.01)

(58) Field of Classification Search
CPC .. F16C 35/02; F16C 17/02; F16C 9/02; F16C 2360/24; F16C 9/04; F16C 226/60; F16C 17/022
USPC ................ 384/129, 432–434, 437, 273, 288, 384/294–295, 435; 123/195 H, 197.4, 123/195 C
See application file for complete search history.

(56) References Cited

U.S. PATENT DOCUMENTS

| | | | | |
|---|---|---|---|---|
| 3,782,792 A | * | 1/1974 | Pfleiderer | ................ F16C 9/02 123/195 H |
| 3,818,577 A | * | 6/1974 | Bailey | ................. B23D 31/003 219/121.2 |
| 4,189,193 A | * | 2/1980 | Schumacher | ............ F16C 9/02 123/195 H |
| 4,422,348 A | * | 12/1983 | Campbell | ................ F16C 9/04 403/344 |
| 4,836,159 A | * | 6/1989 | Lobig | ................... F02F 7/0053 123/195 H |
| 5,051,232 A | * | 9/1991 | Summers | ............... B22F 5/003 419/27 |
| 5,243,878 A | * | 9/1993 | Santi | ....................... F16C 7/023 74/579 E |
| 5,299,871 A | * | 4/1994 | Hancock | .............. F02F 7/0053 123/195 R |

(Continued)

FOREIGN PATENT DOCUMENTS

| | | |
|---|---|---|
| AT | 507 265 A1 | 3/2010 |
| EP | 1 075 605 B1 | 1/2004 |

(Continued)

*Primary Examiner* — Marcus Charles
(74) *Attorney, Agent, or Firm* — Collard & Roe, P.C.

(57) ABSTRACT

A bearing arrangement includes a bearing cover and a bearing block fitting thereon. The bearing block has a recess in the area of the arrangement of the bearing cover, in which the bearing cover can be arranged. The bearing cover has vertically running positioning elements. The bearing cover can be positioned on the bearing block via the vertically running positioning elements.

7 Claims, 2 Drawing Sheets

(56) References Cited

U.S. PATENT DOCUMENTS

| | | | | |
|---|---|---|---|---|
| 5,878,323 | A | * | 3/1999 | Sakai .................... B21K 1/766 29/888.092 |
| 5,905,939 | A | * | 5/1999 | Ishijima ................ B22F 5/003 419/28 |
| 6,027,784 | A | * | 2/2000 | Taguchi ................ F16C 7/023 123/90.61 |
| 6,086,258 | A | | 7/2000 | Cadle et al. |
| 6,431,759 | B1 | | 8/2002 | Luchner et al. |
| 6,435,723 | B1 | * | 8/2002 | Wolf ...................... B23H 9/00 29/898 |
| 6,471,406 | B1 | * | 10/2002 | Cadle ...................... B22F 5/00 384/433 |
| 6,742,259 | B2 | * | 6/2004 | Thompson ............. F16C 35/02 29/466 |
| 8,371,263 | B2 | * | 2/2013 | Knudsen ................ F02B 75/22 123/197.1 |
| 8,690,439 | B2 | | 4/2014 | Dickinger et al. |
| 8,915,230 | B2 | * | 12/2014 | Brautigam ............ B23P 15/003 123/195 R |

FOREIGN PATENT DOCUMENTS

| | | |
|---|---|---|
| JP | 2001-050108 A | 2/2001 |
| JP | 2003-041302 A | 2/2003 |
| JP | 2007-333170 A | 12/2007 |

\* cited by examiner

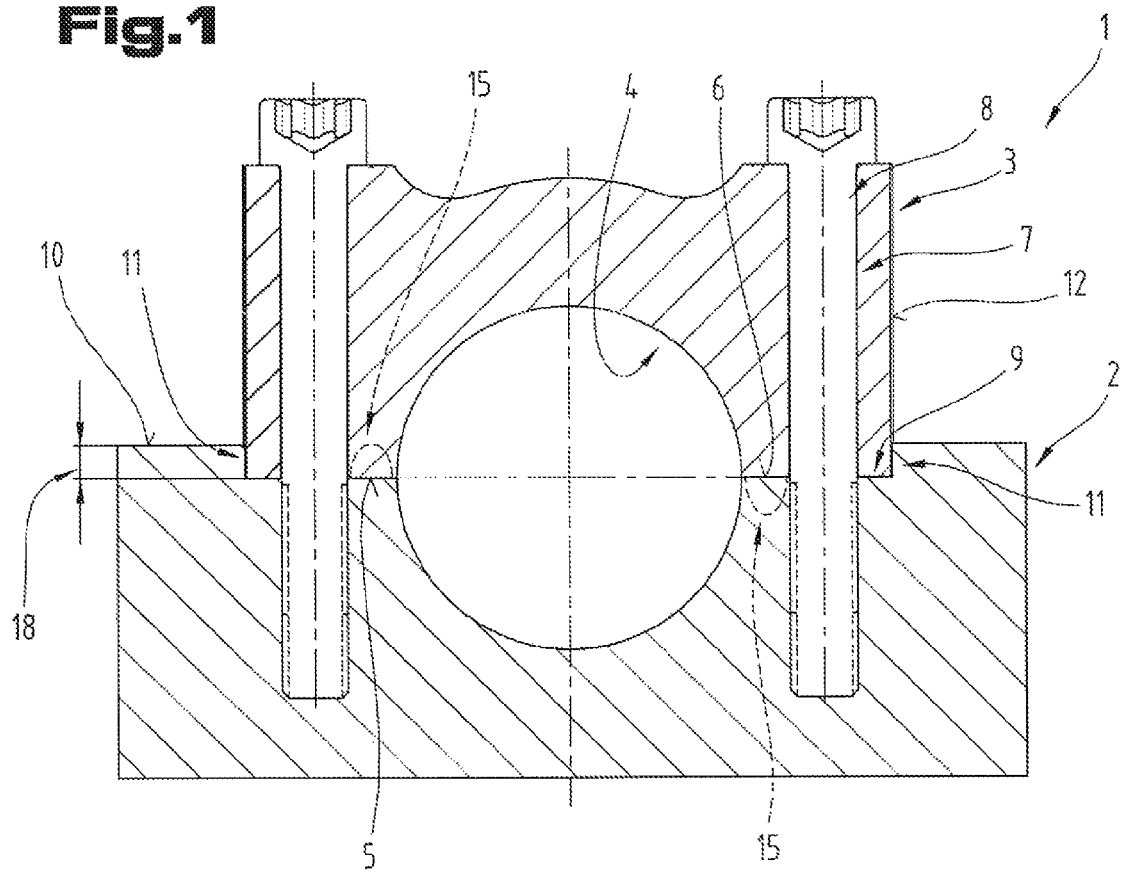
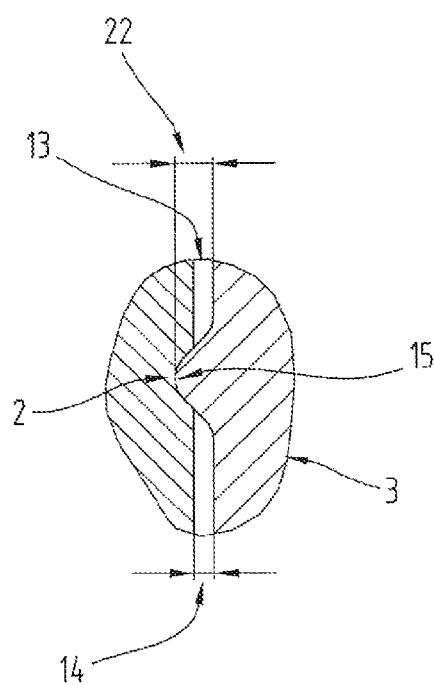
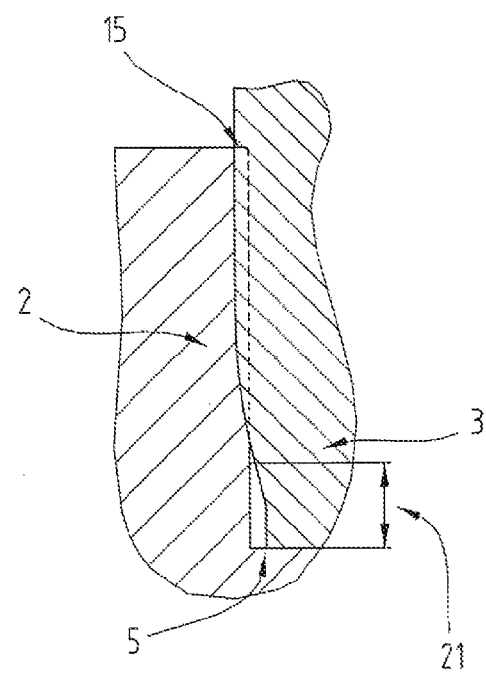

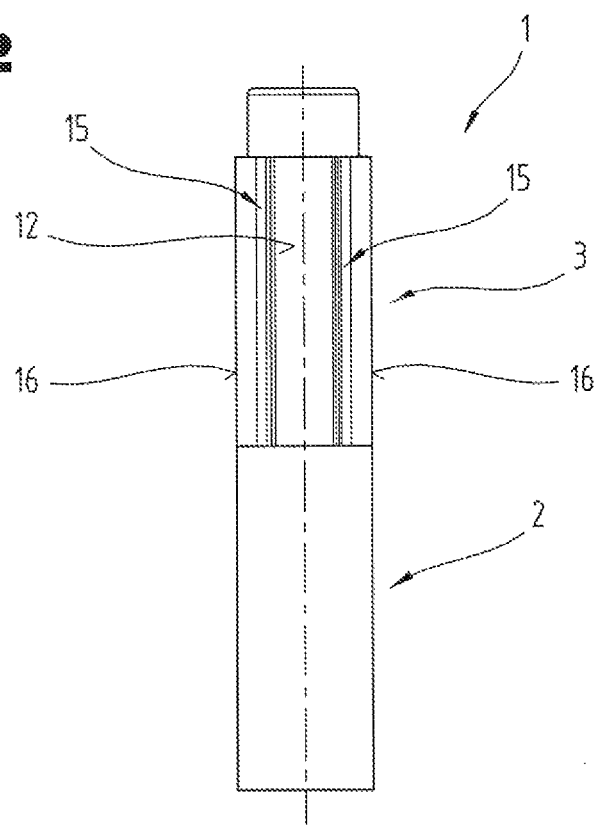
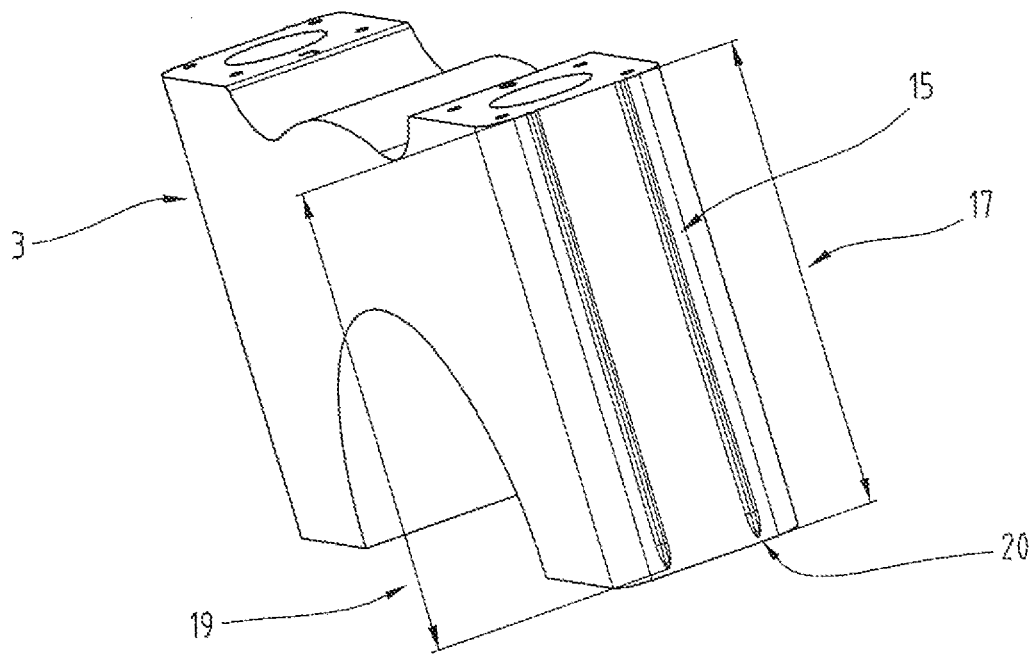

BEARING ARRANGEMENT

CROSS REFERENCE TO RELATED APPLICATIONS

Applicant claims priority under 35 U.S.C. §119 of Austrian Application No. A 503425/2015 filed on Apr. 28, 2015, the disclosure of which is incorporated by reference.

BACKGROUND OF THE INVENTION

1. Field of the Invention

The invention relates to a bearing arrangement comprising a bearing cover and a bearing block arranged on the latter.

2. The Prior Art

Divided bearing arrangements are known from the prior art, for example for connecting rods or crankshafts. The latter usually consist of a bearing block and a bearing cover, wherein the bearing for a shaft is formed between the latter. To form the bearing point the precise fit of the bearing cover on the bearing block is essential. This precise fit needs to be maintained not only during the operation of the bearing but should also be able to be reproduced after the possible disassembly of the bearing cover, which is why the bearing cover needs to adopt the exact position on the bearing block that it had prior to the disassembly.

To achieve this the bearing block and bearing cover are often produced in one piece and then separated by breaking. However, systems are also known which work with positioning elements on the horizontal flat surfaces of the bearing block and the bearing cover fitting on top of one another, wherein the positioning elements during the initial assembly of the bearing cover on the bearing block press into the respective counter surface and thus fix the position of the bearing cover.

For example, the embodiment in EP 1 075 605 B1 describes a divided bearing arrangement in a housing, comprising a bearing block and bearing cover made from materials of different hardnesses, wherein the bearing cover arranged tensioned against the bearing block and made from an iron material has projecting, sharped-edged pointed projections over its clamping surface, which during the initial assembly of the bearing cover can be pushed by the application of force into the counter clamping surface of the bearing block made from a light metal and wherein furthermore grooves are provided in the clamping surface of the bearing cover. The projections are designed to be in the form of cutting edges or have a pyramid profile. The grooves are used for receiving the material of the bearing block which is displaced when pushing the projections into the bearing block.

A different bearing arrangement with such insertable projections is known from AT 507 265 A1.

SUMMARY OF THE INVENTION

The objective of the present invention is to create a divided bearing arrangement in which the bearing cover can be positioned easily on the bearing block.

The objective of the invention is achieved in the aforementioned bearing arrangement in that the bearing block has a recess in the region of the arrangement of the bearing cover, in which recess the bearing cover can be arranged and in that the bearing cover has vertically running positioning elements, by means of which the bearing cover can be positioned on the bearing block.

It is an advantage in this case that it is possible to secure the bearing cover against sliding and position it in a different plane from the tensioning plane between the bearing block and the bearing cover. Thus forces acting in axial direction can be absorbed more effectively. Furthermore, the bearing cover is better supported by arrangement in a recess of the bearing block.

According to one embodiment variant of the bearing arrangement it is possible that the positioning elements are formed by positioning grooves and/or positioning webs. In this way the assembly of the bearing arrangement can be simplified, as by means of the positioning elements the bearing cover can be guided during tensioning.

It is also possible that on side walls of the bearing block delimiting the recess additional positioning elements are arranged. It is thus possible on the one hand to achieve a better tensioning of the bearing cover with the bearing block. On the other hand these additional positioning elements can also be designed to be opposite the positioning elements on the bearing cover, whereby the insertion of the positioning elements on the bearing cover into the counter surface on the bearing block can be simplified, in particular the extent of the material displacement can be reduced by the positioning elements on the bearing cover.

To improve the insertion of the positioning elements on the bearing cover into the counter surface on the bearing block it is possible that the positioning elements of the bearing cover have a longitudinal extension and are designed to taper over the longitudinal extension at least partly. In particular, it is thus an advantage if the initial area of the positioning element on the bearing cover, i.e. the area which comes into contact first with the counter surface on the bearing block, is designed to be tapered, whereby the displacement of material in the counter surface on the bearing block at the start of the tensioning of the bearing cover with the bearing block can be simplified.

For the same reasons it is also possible that the positioning elements of the bearing cover have at least an approximately triangular cross-section.

For the better absorption of lateral forces for each vertical bearing surface of the bearing cover, by means of which the bearing cover bears on the bearing block, at least two positioning elements can be provided.

Preferably, the additional positioning elements are designed to be complementary to the positioning elements of the bearing cover, whereby the latter cooperate better with the positioning elements on the bearing cover.

A further improvement of the tensioning of the bearing cover with the bearing block can be achieved, if at least one additional positioning element is arranged on the horizontal flat surfaces, on which the bearing cover and the bearing block lie on one another.

BRIEF DESCRIPTION OF THE DRAWINGS

For a better understanding of the invention the latter is explained in more detail with reference to the following Figures.

In a simplified, schematic representation:

FIG. 1 is a cross-section of a bearing arrangement;

FIG. 2 is a side view of the bearing cover;

FIG. 3 is a detail of the bearing arrangement in the region of the positioning elements in cross-section;

FIG. 4 is an oblique view of the bearing cover;

FIG. 5 is a detail of a bearing arrangement in the region of the positioning elements in cross-section.

DETAILED DESCRIPTION OF THE PREFERRED EMBODIMENTS

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIGS. 1 to 4 show a divided bearing arrangement 1, as used for example in a machine housing of a reciprocating machine or a connecting rod. The bearing arrangement 1 includes a bearing block 2 and a bearing cover 3, which together form a plain bearing 4 for example for a crankshaft. The bearing cover 3 has at both its distal end sections respectively a clamping surface 5 and the bearing block 2 at both its end sections respectively has counter clamping surfaces 6 opposite the clamping surfaces 5. In the distal end sections a through bore 7 is arranged for tensioning the bearing block 2 with the bearing cover 3. In the bore 7 a bolt 8 is received. The bolt 8 engages in a thread of a blind bore in the bearing block 2, whereby pretensioning can be achieved. Alternatively, in the bearing block 2 the bore can be designed to be continuous and possibly without an internal thread. In this case the pretensioning is achieved by a corresponding nut attached below the bearing block 2 on the bolt 8.

The bearing block 2 has a recess 9, in which the bearing cover 3 is mounted. Thus the counter clamping surface 6 of the bearing block 2 is lowered relative to an outer surface 10. The recess 9 is delimited laterally by side walls 11. The counter clamping surface 6 forms the lower end in the region of the attachment of the bearing cover 3.

In the shown embodiment variant of the bearing arrangement the recess 9 has in axial direction (direction perpendicular to the plane of the paper) a rectangular cross-section (without consideration of the recess adjoining the recess 9 at the bottom which forms a part of the plain bearing or for the plain bearing 4). This cross-section should not be considered to be restrictive however. Rather, the cross-section corresponds to the form of the bearing cover 3—as viewed in the same direction—in the area of the recess 9.

By aligning the cross-section of the recess 9 with the form of the bearing cover 3 the latter bears with at least almost vertically running bearing cover side walls 12 on the side walls 11 or at least approximately, so that a thin gap 13 can be formed between the bearing cover side walls 12 and side walls 11, as shown in FIG. 3. The width 14 of the gap 13 can be thereby selected from a range of 5 μm to 150 μm.

As shown in FIG. 2, on each of the two vertically running bearing cover side walls 12 at least one positioning element 15 (tensioning elements) is arranged or formed, by means of which the bearing cover 3 can be positioned on or in the bearing block 2.

It should be noted that the two bearing cover side walls 15 need not necessarily run vertically (although this is the preferred embodiment variant), but for example can also run obliquely, at an angle to the horizontal, so that the bearing cover 3 tapers in the direction of the bearing block 2.

In the shown embodiment variant of the bearing cover 2 such positioning elements 15 are arranged or formed for each bearing cover side wall 2 respectively. However, also fewer or more than two such positioning elements 15 can be arranged or formed, for example three, four or five, etc.

The two positioning elements 15 for each bearing cover side wall 12 are in particular spaced apart from the axial end faces 16 of the bearing cover 2 and arranged off-center at a distance from one another, as shown in FIG. 2.

In the preferred embodiment variant of the bearing cover 3 the positioning elements 15 are designed as positioning webs projecting over the bearing cover side walls 12, as shown in FIG. 3 and FIG. 4. The positioning elements 15 can however also have a different form, for example they can be designed as positioning grooves which are formed as depressions in the bearing cover side walls 12.

It is also possible that differently designed positioning elements 15 are arranged or formed on the bearing cover side wall or walls 12, for example both positioning webs and positioning grooves.

The positioning elements 15 can extend from the plane of the clamping surfaces 5 over the whole bearing cover side wall height 17. However, it is also possible that the positioning elements 15 extend over only a portion of the bearing cover side wall height 17, whereby however the arrangement should be such that the positioning elements 15 extend at least over a portion of a side wall height 18 of the side walls 11 of the bearing block 2.

On tightening the bearing cover 3 onto the bearing block 2 via the bolt 8 the positioning elements 15 cut into the side walls 11 of the bearing block 2 by material displacement, whereby the positioning of the bearing cover 3 and the repositioning of the bearing cover 2 can be achieved after the disassembly of the latter, for example in order to repair the plain bearing 4, so that the bearing cover 3 on re-assembly adopts the correct position again relative to the bearing block 2.

The positioning elements 15 can have a uniform cross section over the whole longitudinal extension 19. However, according to another embodiment variant of the bearing arrangement 1 it is also possible that the positioning elements 15 of the bearing block 2 are designed to taper at least partly over the longitudinal extension 19, as shown in FIG. 4. In particular, a lower section 20 of the positioning elements 15 is designed to taper in the direction of the clamping surface 5, for example to be pointed. In this way the penetration of the positioning elements 15 into the side walls 11 of the bearing block 2 can be simplified on tensioning with the bearing cover 3.

It is also possible however that the positioning elements 15 are arranged at first at a distance 21 from the plane of the clamping surfaces 5, as shown in FIG. 5. In this way the insertion of the bearing cover 3 into the recess 9 of the bearing block 2 can be simplified. The distance 21 can be selected from a range of 0.5 mm to 15 mm.

For penetrating more easily into the side faces 11 of the bearing block 2 the positioning elements 15 can have an at least approximately triangular cross-section—as viewed in the direction of their longitudinal extension 19—so that the latter are designed in the form of cutting edges. The term at least approximately means that the positioning elements 15 can also be provided in part with a rounded section. In particular, the tip of the triangle can be designed to be rounded, as shown in FIG. 3. In other words, the positioning elements 15 can also have a wave-like cross-section.

However, other cross-sectional forms can be used for the positioning elements 15, for example with rhomboid or generally polygonal cross-sections.

Preferably, the longitudinal extension 19 of the positioning elements 15 is greater than a height 22. The height 22 is here the projection of the positioning elements 15 over the bearing cover side wall 12. The height 22 of the positioning elements 15 can be selected from a range of 5 μm to 3 mm.

According to another embodiment variant of the bearing arrangement 1 it is possible that the positioning elements 15 are arranged or designed not as in the aforementioned embodiment variants solely on the bearing cover side walls 12 of the bearing cover 3 but solely on the side walls 11 of the bearing block 2.

It is also possible that according to a further embodiment variant of the bearing arrangement 1 additional positioning elements 15 are arranged on the bearing cover side walls 12 of the bearing cover 3 and on the side walls 11 of the bearing block 2 opposite the bearing cover side walls 12. The additional positioning elements 15 can be designed to be complementary to the positioning elements 15 of the bearing cover 3, i.e. with a cross-sectional form which is inverse to that of the positioning elements 15 of the bearing cover 3. In this way the positioning elements 15 of the bearing cover 3 can work together with the additional positioning elements 15 of the bearing block 2. For example, the positioning elements 15 of the bearing cover 3 can be designed as positioning webs and the additional positioning elements 15 of the bearing block 2 can be designed as positioning grooves, wherein the positioning webs 15 of the bearing cover 3 engage in the positioning grooves of the bearing block 2. Preferably, in this case the additional positioning elements 15 of the bearing block 2 are designed to be smaller so that in this embodiment variant the positioning elements 15 of the bearing cover 3 also cut into the material of the bearing block 3.

In principle also a reverse arrangement of this embodiment is possible in that for example the positioning grooves are formed on the bearing cover 3 and the positioning webs are formed on the bearing block 2.

It is also possible that the additional positioning elements 15 on the bearing block 2 do not cooperate with the positioning elements 15 on the bearing cover 3, but are arranged offset to the latter so that for example both the positioning elements 15 and also the additional positioning elements 15 cut into the respective material of the other component.

According to another embodiment variant of the hearing arrangement 1 it is also possible that not only the positioning elements 15 are designed or arranged on the bearing cover 3 and possibly the additional positioning elements 15 are designed or arranged on the bearing block 2, but additional positioning elements 15 are formed on the clamping surface 5 of the bearing cover 3 and/or on the counter clamping surface 6 of the bearing block 2. The additional positioning elements 15 can be designed in particular according to the projections described in AT 507 265 A1. Particular reference is therefore made to the disclosure of AT 507 265 A1 with respect to the projections, which in this respect forms part of the present description. For example, the additional positioning elements can be designed as discreet projections or as positioning webs, etc.

In the preferred embodiment variant the bearing block 2 or the bearing cover 3 or the bearing block 2 and the bearing cover 3 are produced as sintered components from a sintering material.

The example embodiments show possible embodiment variants of the bearing arrangement 1, whereby it should be noted at this point that also various different combinations of the individual embodiment variants are possible.

Lastly, for the sake of formality, it should be noted that for a better understanding of the structure of the bearing arrangement 1, the latter and its components have not been shown to scale and/or have been enlarged and/or reduced in size.

LIST OF REFERENCE NUMERALS 1 bearing arrangement
2 bearing block
3 bearing cover
4 plain bearing
5 clamping surface
8 counter clamping surface
7 bore
8 bolt
9 recess
10 outer surface
11 side wall
12 bearing cover side wall
13 gap
14 gap width
15 positioning element
18 end face
17 bearing cover side wall height
18 side wall height
19 longitudinal extension
20 section
21 distance
22 height

The invention claimed is:

1. A bearing arrangement comprising a bearing cover and a bearing block bearing thereon,
   wherein the bearing block has a recess in the area of the arrangement of the bearing cover,
   wherein the bearing cover can be arranged in the recess,
   wherein the bearing cover comprises vertically running positioning elements,
   wherein the bearing cover can be positioned on the bearing block via the vertically running positioning elements,
   wherein the recess of the bearing block for the arrangement of the bearing cover is delimited by side walls, and
   wherein said side walls comprise additional positioning elements.

2. The bearing arrangement as claimed in claim 1, wherein the vertically running positioning elements are formed by positioning grooves, positioning webs, or positioning grooves and positioning webs.

3. The bearing arrangement as claimed in claim 1, wherein the vertically running positioning elements of the bearing cover have a longitudinal extension and are designed to taper at least partly over the longitudinal extension.

4. The bearing arrangement as claimed in claim 1, wherein the vertically running positioning elements of the bearing cover have an at least approximately triangular cross-section.

5. The bearing arrangement as claimed in claim 1, wherein the additional positioning elements are designed to be at least almost complementary to the vertically running positioning elements of the bearing cover.

6. The bearing arrangement as claimed in claim 1, wherein the bearing cover and the bearing block each have horizontal flat surfaces, on which the bearing cover fits on the bearing block, and
   wherein on said flat surfaces at least one flat surface positioning element is arranged.

7. A bearing arrangement comprising a bearing cover and a bearing block bearing thereon,
   wherein the bearing block has a recess in the area of the arrangement of the bearing cover,
   wherein the bearing cover can be arranged in the recess,
   wherein the bearing cover comprises vertically running positioning elements,
   wherein the bearing cover can be positioned on the bearing block via the vertically running positioning elements,
   wherein the bearing cover has vertical bearing faces,
   wherein the bearing cover fits on the bearing block via the vertical bearing faces, and
   wherein for each vertical bearing face at least two of the vertically running positioning elements are arranged.

* * * * *